D. BYRNE.
COMBINATION TERMINAL AND FIXTURE BOX.
APPLICATION FILED JULY 30, 1917.

1,265,879.

Patented May 14, 1918.

INVENTOR
David Byrne
by

UNITED STATES PATENT OFFICE.

DAVID BYRNE, OF TOLEDO, OHIO, ASSIGNOR OF ONE-THIRD TO WILLIAM M. GORE AND ONE-THIRD TO CHARLES T. LAWTON, BOTH OF TOLEDO, OHIO.

COMBINATION TERMINAL AND FIXTURE BOX.

1,265,879.      Specification of Letters Patent.      Patented May 14, 1918.

Application filed July 30, 1917. Serial No. 183,551.

*To all whom it may concern:*

Be it known that I, DAVID BYRNE, a citizen of the United States, and a resident of Toledo, in the county of Lucas and State of Ohio, have invented a certain new and useful Combination Terminal and Fixture Box; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to terminal boxes and it has for its object to provide a means whereby a terminal box or plate may be readily formed into a fixture box or plate. Structures containing the invention may partake of modified forms. I have selected one or two forms which I shall describe hereinafter. The constructions selected are illustrated in the accompanying drawings.

Figure 1:
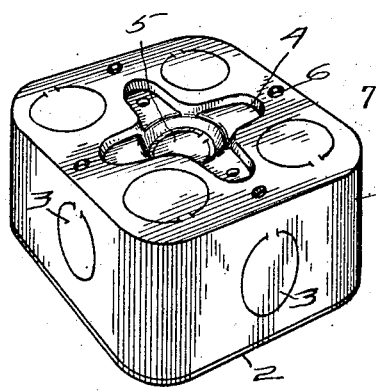
Figure 2:
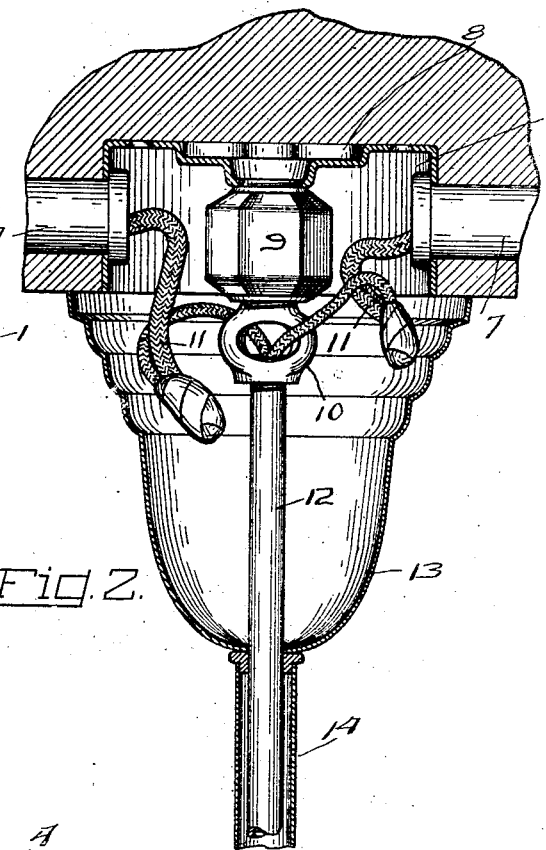
Figure 3:
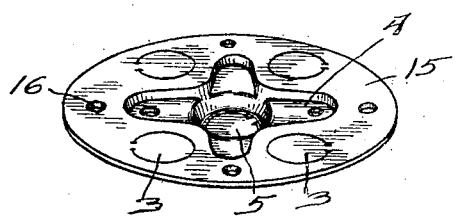
Figure 4:
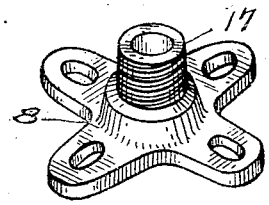

Figure 1 of the drawings illustrates one form of construction, Fig. 2 illustrates the box illustrated in Fig. 1 used as a fixture box. Fig. 3 is a modified form of construction, Fig. 4 is a holding member for the fixture and which may be used in conjunction with the box illustrated in Fig. 1 or with the plate illustrated in Fig. 3.

1, Fig. 1, is the terminal box having any form of cover or lid 2 for closing the box. The lid 2 is used, preferably, when the box is used as a terminal box and is omitted when the box is used as a fixture box. The box is provided with knockout-out openings or disks that are partially cut at different points in the surfaces of the box. The disks 3 may be struck with a hammer and bent back and forth until they break off. As many disks may be struck out from the box as there are terminal lines to be connected or interconnected as may be required. The electrical wires enter into the sides of the box through porcelains or through looms and are suitably connected together, the box giving plenty of room for containing the insulated joints formed by the connections. The center of the box is provided with a depression 4 and also the knockout disk 5 which is located in the center of the depression. The opening that may be formed by the disk 5 that is knocked out may be used as an opening for a wire or it may be used for receiving the threaded end portion 17 of the fixture holder 8 illustrated in Fig. 4. The depression 4 is of such a shape that it will receive the flange and lugs of the fixture holder. The depression partakes of the form of the holder 8 which snugly fits therein and then the box may be secured to a partition by screws which pass through openings 6 located in the bottom of the box. The lugs or arms of the fixture holder fitting into the depression 4, the depression having the same shape as the contour of the lugs or arms of the fixture holder and thus rotation of the fixture holder is prevented when a connector or other member is threaded on to the fixture holder. Also the box may be secured in position in cement or plaster thereby securing the fixture holder if the same is placed in position and if the box is to be used as a fixture box. Also if desired, the fixture holder may be placed in the recess and the box secured in position and the box may, notwithstanding the presence of the fixture holder, be used as a terminal box. In Fig. 2, the box 1 is shown secured in position in a ceiling and the porcelains 7 passed through openings which are formed by knockouts of the disks 3 also the fixture holder 8 is secured in position by the box being secured in a ceiling or in a side wall as the case may be. If a fixture is to be connected to the terminal box, a suitable insulating member 9 may be threaded on to the fixture holder and an eye-member 10 may be secured in the insulating member 9. The wires 11 may then be connected and pass down to the pipe 12 which leads to the lamps. The decorative bell 13 and a sleeve 14 is placed on the pipe 12 in the manner well known in the art.

In Fig. 3 is shown a disk 15 having in its center the depression 4 and arranged around the center are a plurality of knockout disks 3. The holder 8 may be placed in the depression and the threaded portion of the holder may pass through the opening formed by striking out the disk 5. The parts may be secured to the ceiling or other part of the building by nails or screws that pass through the openings 16.

I claim:

In a combined fixture holder and terminal box, a fixture holder having arms extending laterally therefrom and a threaded boss, a member having a depression, the depression having the form the same as the contour of the arms of the fixture holder for receiving the fixture holder, a knockout disk located in the bottom of the depression for receiving the threaded boss of the fixture holder and a plurality of knockout disks for receiving electric wires.

In testimony whereof, I have hereunto signed my name to this specification.

DAVID BYRNE.

Copies of this patent may be obtained for five cents each, by addressing the "Commissioner of Patents, Washington, D. C."